US005641372A

United States Patent [19]

Okuno

[11] Patent Number: 5,641,372

[45] Date of Patent: Jun. 24, 1997

[54] TRANSFERRING APPARATUS AND TRANSFERRING METHOD

[75] Inventor: Shiro Okuno, Kyoto, Japan

[73] Assignee: Nissha Printing Co., Ltd., Kyoto, Japan

[21] Appl. No.: 838,727

[22] PCT Filed: Jul. 12, 1991

[86] PCT No.: PCT/JP91/00936

§ 371 Date: Mar. 13, 1992

§ 102(e) Date: Mar. 13, 1992

[87] PCT Pub. No.: WO92/01560

PCT Pub. Date: Jun. 2, 1992

[30] Foreign Application Priority Data

Jul. 18, 1990 [JP] Japan .................................... 2-192754

[51] Int. Cl.$^{6}$ ...................................................... B32B 31/00

[52] U.S. Cl. .......................... 156/230; 156/238; 156/286; 156/382; 156/540

[58] Field of Search .................................... 156/230, 234, 156/238, 285, 286, 540, 382, 541, 542, 583.3

[56] References Cited

U.S. PATENT DOCUMENTS

| | | | |
|---|---|---|---|
| 3,818,823 | 6/1974 | Bond | 156/230 X |
| 4,098,184 | 7/1978 | Okada et al. | 101/41 |
| 4,288,275 | 9/1981 | Davis | 156/541 X |
| 4,944,822 | 7/1990 | Ishikawa et al. | 156/382 X |
| 5,108,532 | 4/1992 | Then et al. | 156/285 |
| 5,152,861 | 10/1992 | Hann | 156/230 |

FOREIGN PATENT DOCUMENTS

| | | |
|---|---|---|
| 16-17335 | 10/1941 | Japan . |
| 48-53805 | 7/1973 | Japan . |
| 55-9305 | 3/1980 | Japan . |
| 59-135160 | 8/1984 | Japan . |
| 59-37234 | 9/1984 | Japan . |
| 60-4759 | 2/1985 | Japan . |

*Primary Examiner*—David A. Simmons
*Assistant Examiner*—Paul M. Rivard
*Attorney, Agent, or Firm*—Wenderoth, Lind & Ponack

[57] ABSTRACT

A transferring apparatus and a transferring method are disclosed for pressing a transferring member against a three dimensional material. Fluid pressure is applied to a sheet which press the transferring member against and cause it to conform to the three-dimensional configuration of the material. Thus, the pattern of the transferring member can be easily and reliably transferred to the material (1) even though the material has the three-dimensional configuration.

18 Claims, 3 Drawing Sheets

TRANSFERRING APPARATUS AND TRANSFERRING METHOD

TECHNICAL FIELD

The present invention relates to a transferring apparatus and a transferring method for performing a transfer of a transferring member to a three-dimensional molded article.

BACKGROUND ART

Transfer methods are widely utilized to form patterns or characters on the surface of an article such as a household electric appliance, a cosmetic container, ornaments or the like. Fundamentally, a transferring member to be used in transferring method has a construction comprising a in transferring layer such as a pattern layer and an adhesive layer formed on a release sheet. The transferring member may include a surface protecting layer as necessary or may not include the adhesive layer when the pattern layer has an adhesive property. As transfer methods, a roll transfer method and an up-down transfer method are well known and utilized for many articles such as household electric appliances, cosmetic containers, sundry goods or the like. According to these transfer methods, a pressurizing member such as a roller or a member moving vertically presses a heated silicon rubber provided on the transferring member against a material (or article) so that the pattern of the transferring member is transferred to the material. In the roll transfer method, the thickness of the silicon rubber is in the range from 10 mm to 50 mm and the hardness thereof is in the range from 60° to 90°. In the up-down transfer method, the thickness of the silicon rubber is in the range from 2 to 5 mm and the hardness thereof is in the range from 60° to 90°.

However, in these transfer methods, since the contact surface of the silicon rubber serving as a heat source is linear or flat, the configuration of the material (or article) to which the pattern of the transferring member is to be transferred is limited to a two-dimensional curved surface or a flat surface. Thus, it is difficult to transfer the pattern of the transferring member to a three-dimensional material.

Accordingly, an object of the present invention is to solve the above-described problem and provide a transferring apparatus and a transferring method for easily and reliably transferring the pattern of a transferring member to a material (or article) in a three-dimensional configuration.

SUMMARY OF THE INVENTION

In order to achieve the above-described object, the present invention is so constructed that a flexible sheet is pressed against a material (or article) through a transferring member by applying fluid pressure to the flexible sheet and the transferring member conforms to the surface of the material even though the material has a three-dimensional configuration.

That is, a transferring apparatus of the present invention comprises:

a placing base for placing a material (or article) thereon;

a flexible sheet opposed to a transfer region of the material placed on the base;

in a transferring member mounted between the flexible sheet and the base;

a sheet supporting frame for supporting the sheet on a surface opposed to the material, having a sheet pressurizing chamber on the side of the sheet opposite to the side of the sheet opposed to the material, and a means for heating the sheet;

a fluid supply member for supplying fluid to the pressurizing chamber of the supporting member; and a driving member for moving one of the sheet and the material placed on the base with respect to the other.

In the above-described construction, after the sheet is pressed against the material through the transferring member, the fluid supply member may supply the fluid to the pressurizing chamber to apply pressure to the sheet.

In the above-described construction, the fluid supply member may supply the fluid to the pressurizing chamber so as to pressurize the sheet before the sheet contacts the transferring member.

In the above-described construction, the driving member may move the supporting member relative to the material placed on the base.

In the above-described construction, the driving member may move the base relative to the supporting member.

In the above-described construction, the base may have a plurality of suction holes and a suction member for sucking gas through the sucking holes when a transfer is carried out with the transferring member contacting the material.

A transferring method according to the present invention comprises the steps of:

placing a material on a base;

placing on a transfer region of the material the transferring member having a pattern layer formed on a release sheet so that a pattern of the pattern layer is positioned on the material;

pressing a heated flexible sheet against the material through the transferring member;

transferring the pattern of the pattern layer of the transferring member to the material by further pressing the sheet against the material through the transferring member by applying fluid pressure to the sheet; and removing the sheet and the release sheet of the transferring member from the material after the transferring step is completed.

A transferring method according to the present invention comprises the steps of:

placing a material on a base;

placing on a transfer region of the material a transferring member having a pattern layer formed on a release sheet so that a pattern of the pattern layer is positioned on the side of the material;

pressing a heated flexible sheet to which fluid pressure is being applied against the material through the transferring member so as to transfer the pattern of the pattern layer of the transferring member to the material; and removing the sheet and the release sheet of the transferring member from the material after the transferring step is completed.

In the above-described method, fluid existing between the material and the transferring member may be discharged in carrying out the transferring operation.

In the above-described method, an adhesive layer may be formed on one of the pattern layer and the material before the sheet is pressed against the material through the transferring member.

The "pattern layer" includes a colorless, transparent surface protecting layer for protecting the surface of a material to which a pattern is transferred and a ground adjusting layer serving as a ground when a pattern is formed with a painting brush neither by means of a transfer.

According to the construction of the above-described present invention, even though the material has a three-dimensional configuration on its surface, when the sheet is pressed against the material through the transferring member, fluid is supplied to the pressurizing chamber of the supporting member so that the sheet and the transferring member conform to the surface of the material in a three-dimensional configuration by the fluid pressure, and the pattern of the pattern layer of the transferring member can be easily and reliably transferred to the material surface in the three-dimensional configuration. In addition, during the transfer, since the suction member evacuates gas existing between the material and the transferring member, the unnecessary gas does not penetrate into the space between the material and the transferring member. Consequently, the transferring member is capable of closely contacting the surface of the material and the pattern of the transferring member can be finely transferred to the surface of the material. Therefore, even if a concave is formed on the material to which the pattern of a transferring member is to be transferred, the transferring member can be brought into close contact with the surface of the concave by means of the suction device which evacuates gas existing in the concave. Thus, the pattern of the transferring member is finely transferred to the concave surface of the material. An in-mold transferring apparatus is used to transfer the pattern of the transferring member to the material in a three-dimensional configuration. In an in-mold transferring method, since the transferring member is inserted into a molding die before a transfer is carried out, disadvantageously, the space for placing the transferring member is limited and the configuration of the molding die is complicated, whereas the transferring apparatus of the above-described present invention does not have such a disadvantage.

According to the above-described embodiment, even though the material has a three-dimensional configuration on its surface, when the sheet is pressed against the material through the transferring member, the sheet and the transferring member are capable of conforming to the surface of the material in a three-dimensional configuration by the fluid pressure. Thus, the pattern of the pattern layer of the transferring member can be reliably and easily transferred to the surface of the material in the three-dimensional configuration. In addition, during the transfer, unnecessary gas does not penetrate into the space between the material and the transferring member because fluid existing between the material and the transferring member is discharged. Consequently, the transferring member is capable of closely contacting the surface of the material and the pattern of the transferring member can be finely transferred to the surface of the material. Therefore, even if a concave is formed on a material to which the pattern of a transferring member is to be transferred, the transferring member can be brought into close contact with the surface of the concave by discharging fluid in the concave. Thus, the pattern of the transferring member is finely transferred to the concave surface of the material. Further, in-mold transferring method is used to transfer the pattern of the transferring member to the material in a three-dimensional configuration. In the in-mold transferring method, since the transferring member is inserted into a molding die before a transfer is carried out, disadvantageously, the space for placing the transferring member is limited and the configuration of the molding die is complicated, whereas the transferring apparatus of the above-described present invention does not have such a disadvantage.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
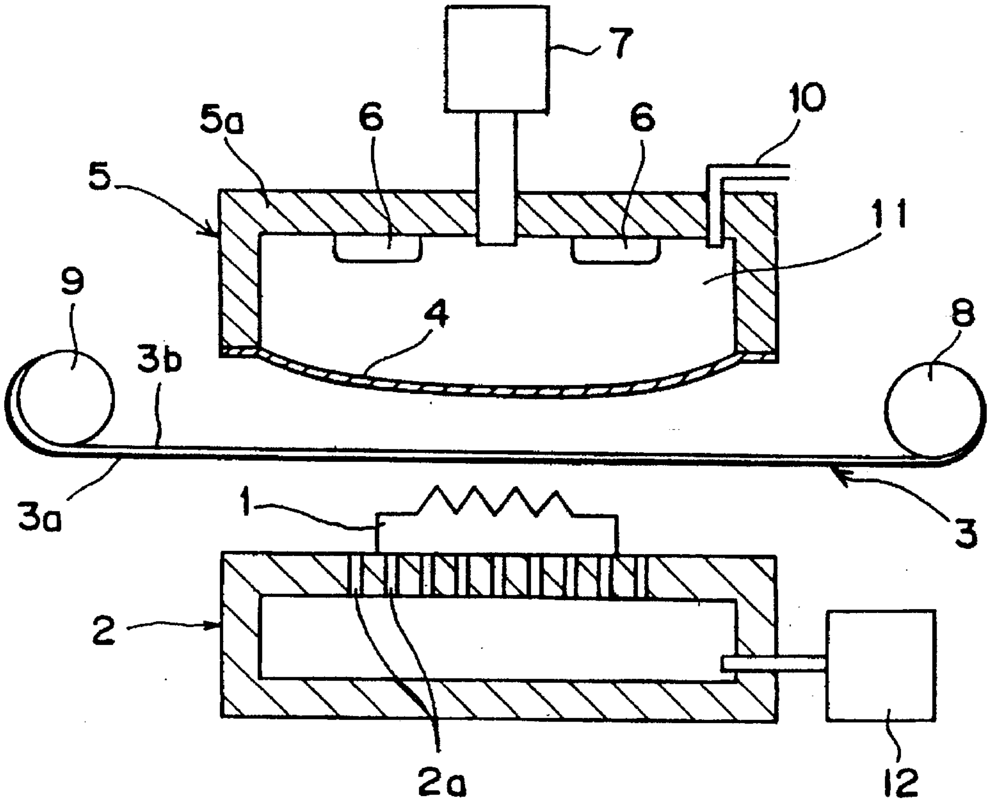
FIG. 1 is a sectional view showing a transferring apparatus in use in a transferring process according to an embodiment of the present invention.

Before the description of the present invention proceeds, it is to be noted that like parts are designated by like reference numerals throughout the accompanying drawings.

The embodiments of the present invention are described in detail below based on FIGS. 1 through 5.

Figure 2:
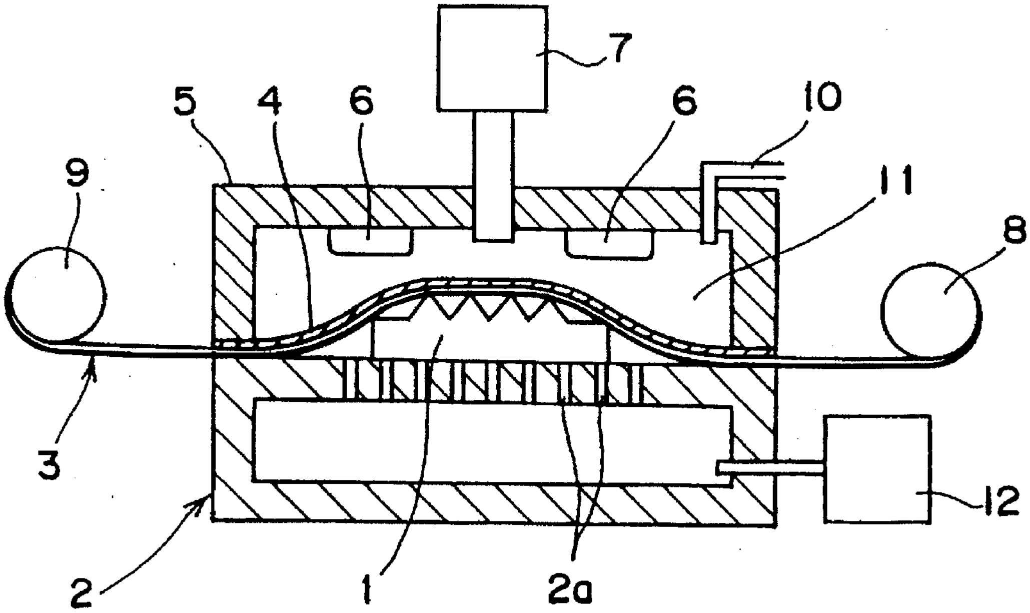
FIG. 2 is a sectional view showing the use in the transferring apparatus in transferring process.

In order to perform a transfer, in a transferring apparatus according to the invention, a material 1 to which the pattern of a transferring member 3 is to be transferred is placed on a base 2. A heated flexible sheet 4 supported by a supporting member 5 is on a side of the material 1 opposite the transferring member 3. A driving member (not shown) is provided to drive the supporting member 5 downward toward the base 2 to press the sheet 4 against the material 1 through the transferring member 3 as shown in FIG. 2.

The upper surface of the base 2 is flat and has many suction holes *2a* formed therein and these suction holes *2a* are connected with a suction member 12 so that gas existing between the material 1 and the transferring member 3 is evacuated.

The transferring member 3 is roll-shaped and comprises a release sheet *3b*, a release layer formed on the release sheet *3b* a pattern layer *3a* formed on the release layer, and an adhesive layer formed on the pattern layer *3a*. The release sheet *3b* consists of a base film having a releasing property, and the release layer is left on the pattern layer *3a* when the release sheet *3b* is separated from the pattern layer *3a* to function as a protecting layer to protect the pattern layer *3a*. The pattern layer *3a* has patterns such as pictures thereon. The pattern layer *3a* may be formed of multiple layers or include a metal evaporating layer. The pattern layer *3a* may include a surface protecting layer as necessary. That is, the above-described "pattern layer" includes a colorless, transparent surface protecting layer for protecting the surface of a material 1 to which the pattern of the transferring member is transferred and a ground adjusting layer serving as a ground when a design is formed with a painting brush rather than by means of a transfer.

A feed-out roller 8 and a winding roller 9 are provided, respectively on both sides of a region in which the base 2 and the supporting member 5 are provided in opposition to each other. The roll-shaped transferring member 3 is sequentially fed out from the feed-out roller 8 toward the winding roller 9. When a predetermined pattern of the pattern layer *3a* is transferred to the material 1, a subsequent pattern of the pattern layer *3a* formed on the release sheet *3b* is fed out from the feed-out roller 8 by a predetermined pitch while the release sheet *3b* removed as a result of the transfer of the pattern layer *3a* to the material 1 is rolled round the winding roller 9. The transferring member 3 is not limited to a roll configuration, but may be composed of strips of paper so that the transferring member 3 is replaced each time a transfer is performed.

The sheet 4 may consist of, for example, a silicon rubber elastically deformable along a three-dimensional configuration of the material 1 which is approximately 2 mm to 3 mm thick.

The supporting member 5 supports the sheet 4 on the side of the transferring member 3 opposite the material 1 (i.e. above the transferring member 3 as shown in the drawings) by bringing the sheet 4 into close contact with a container 5*a* thereof. A sheet pressurizing chamber 11 which can be enclosed by the container 5*a* is formed on the side of the sheet 4 opposite the material 1 (i.e. above the sheet 4 as shown in the drawings). The sheet 4 is heated by heaters 6 provided on a bottom surface of the container 5*a*. Reference numeral 10 in the drawings denotes a discharge pipe for discharging fluid supplied into the pressurizing chamber 11.

Liquid such as water or oil or gas such as vapor or compressed air is supplied from a fluid supply member 7 into the pressurizing chamber 11 of the supporting member 5, thus supporting the sheet 4 in a pressurized state against the transferring member 3.

The supporting member 5 can be moved toward the material 1 placed on the base 2 or moved away therefrom by a driving member (not shown).

Figure 3:
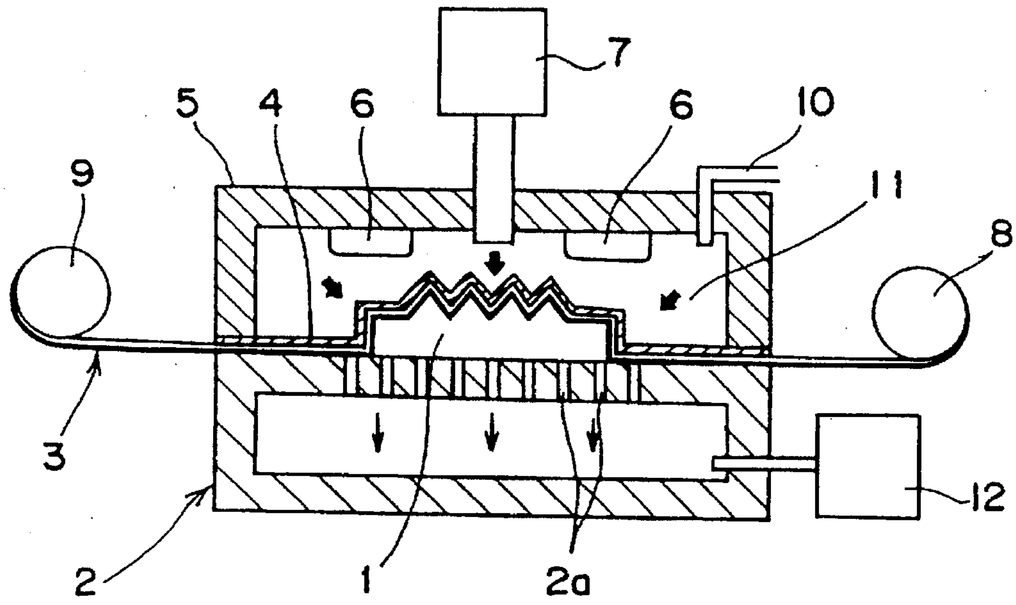
FIG. 3 is a sectional view showing the transferring apparatus in use in the transferring process.
Figure 4:
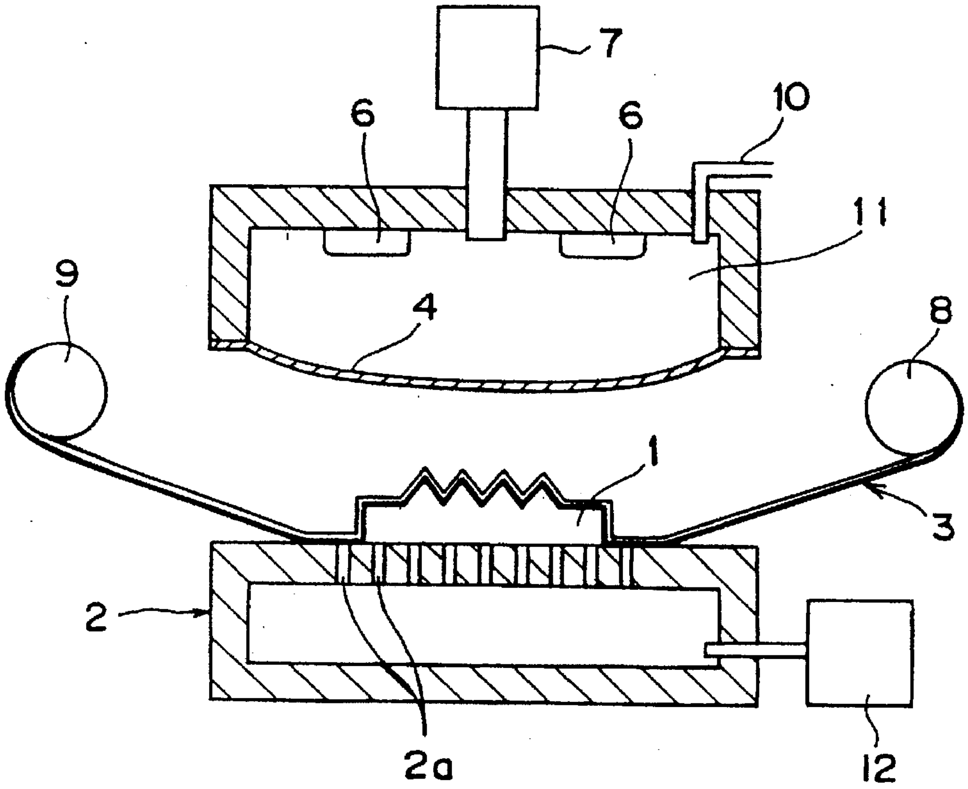
FIG. 4 is a sectional view showing the transferring apparatus in use in the transferring process.
Figure 5:
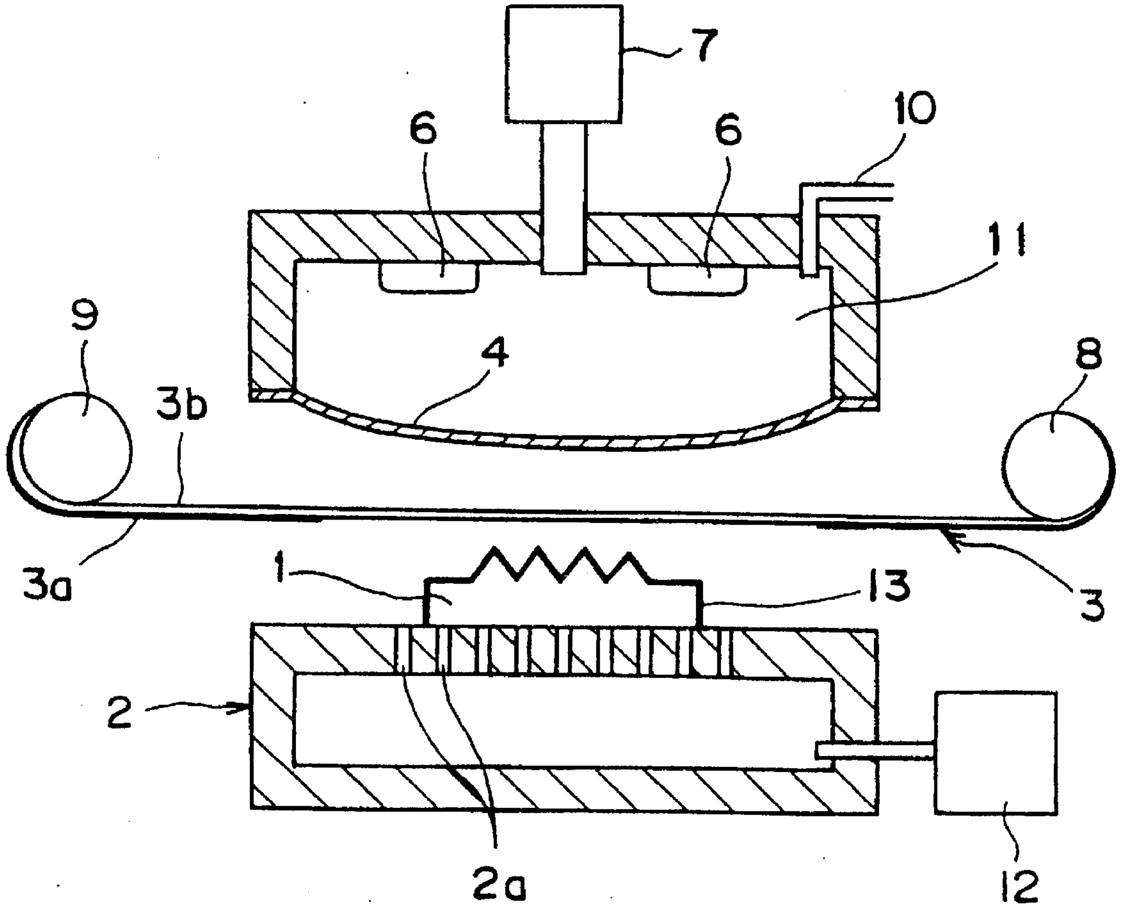
FIG. 5 is a sectional view showing the transferring apparatus in use in the transferring process.

According to the above-described construction, as shown in FIG. 1, the material 1 is placed on the upper surface of the base 2 and the pattern layer 3*a* of the transferring member 3 which is to be transferred is opposed to the material 1 via the adhesive layer. At this time, the sheet 4 is heated by the heaters 6. Then, as shown in FIG. 2, the supporting member 5 is moved downward so that the sheet 4 causes the transferring member 3 to contact the material 1, and so that the lower end surface of the container 5*a* of the supporting member 5 is pressed against the upper surface of the base 2 through the sheet 4. Thereafter, as shown in FIG. 3, fluid is supplied from the fluid supply member 7 into the pressurizing chamber 11 of the supporting member 5 so that pressure is applied to the sheet 4 and the sheet 4 presses the transferring member 3 against the upper surface of the material 1. Thus, the sheet 4 and the transferring member 3 conform to the three-dimensional configuration of the upper surface of the material 1 and the pattern of the pattern layer 3*a* of the transferring member 3 is transferred to the surface of the material 1 in the three-dimensional configuration by the fluid pressure and heat transmitted from the sheet 4. In this transfer, the suction member 12 sucks fluid such as gas existing between the material 1 and the transferring member 3 through the suction holes 2*a* of the base 2 so that the pattern layer 3*a* of the transferring member 3 closely contacts the surface of the material 1 via the adhesive layer. Then, the supporting member 5 is moved upward as shown in FIG. 4 after the fluid in the pressurizing chamber 11 is released from the discharge pipe 10. Thereafter, as shown in FIG. 5, the feed-out roller 8 and the winding roller 9 are driven so that the release sheet 3*b* from which the pattern of the pattern layer 3*a* has been transferred to the material 1 is moved away from the surface of the material 1 by rolling the release sheet 3*b* around the winding roller 9, and the subsequent pattern layer 3*a* is positioned above the base 2. In this state, the release layer separated from the release sheet 3*b* and a pattern 13 of the pattern layer 3*a* have been transferred and adhered to the surface of the material 1 through the adhesive layer. The release layer functions as the protecting layer of the pattern layer 3*a*.

According to the above-described embodiment, even though the material has a three-dimensional configuration on its surface, when the sheet 4 is pressed against the material 1 via the transferring member 3, fluid is supplied to the pressurizing chamber 11 of the supporting member 4 so that the sheet 4 and the transferring member 3 conform to the surface of the material 1 in the three-dimensional configuration by the fluid pressure and the pattern of the pattern layer 3*a* of the transferring member 3 can be easily and reliably transferred to the surface of the material 1 in the three-dimensional configuration. Accordingly, if a material has a rounded corner, the sheet and the transferring member contact each other along the rounded corner to which a pattern is to be transferred. Therefore, the pattern of the transferring member can be finely and reliably transferred to the material at the rounded corner. In addition, during the transfer, since the suction member 12 evacuates gas existing between the material 1 and the transferring member 3, the unnecessary gas does not penetrate into the space between the material 1 and the transferring member 3. Consequently, the transferring member 3 is capable of closely contacting the surface of the material 1 and the pattern of the transferring member 3 can be finely transferred to the surface of the material 1. Therefore, even if a concave is formed on the material to which the pattern of the transferring member 3 is to be transferred, the transferring member can be brought into close contact with the surface of the concave by the suction device which evacuates gas existing in the concave. Thus, the pattern of the transferring member 3 is finely transferred to the concave surface of the material 1. An in-mold transferring method has been used to transfer patterns of the from transferring members to the surfaces of material in a three-dimensional configuration. In the in-mold transferring method, since the transferring member is inserted into a molding die before a transfer is carried out, disadvantageously, the space for placing the transferring member is limited and the configuration of the molding die is complicated; whereas the transferring apparatus of the above-described embodiment does not have such a disadvantage.

The present invention is not limited to the above-described embodiment, but various modifications may be made.

For example, a similar operation and effect can be brought about by moving the base 2 toward the supporting member 5 or moving it away therefrom.

It is possible to bring the pressurized sheet 4 into contact with the transferring member 3 by supplying fluid to the pressurizing chamber 11 of the supporting member 5 before the sheet 4 contacts the transferring member 3 and press the sheet 4 against the material 1 through the transferring member 3.

Fluid may be discharged from the pressurizing chamber 11 after the sheet 4 separates from the transferring member 3.

The sheet 4 may be pressed against the material 1 through the transferring member 3 only in the region in which the pattern of the transferring member 3 is transferred to the material 1.

The construction of the transferring member 3 is not limited to the above-described one, but may be varied.

For example, in the above embodiment, when the release sheet 3*b* is separated from the material 1, the release layer of the release sheet 3*b* is left on the pattern layer 3*a*, thus functioning as the protecting layer of the pattern layer 3*a*. However, the release sheet 3*b* may consist of a base film and a release layer so that the release layer is separated from the pattern layer 3*a* by separating the release sheet 3*b* from the pattern layer 3*a*. Preferably, the release layer may consist of the base film and coated resin on the base film or films laminated one on the other.

The transferring member 3 may be composed without forming the adhesive layer on the pattern layer. That is, the transferring member 3 may consist of the release sheet made of a base film; the release layer which is left on the pattern layer when the release sheet is separated from the material; and the pattern layer having adhesive property and patterns. In this case, the pattern layer functions as the adhesive layer. Thus, the construction of the transferring member can be simplified by not providing the adhesive layer.

Further, the transferring member 3 may consist of the release sheet made of the base film; the release layer which is left on the pattern layer when the release sheet is separated from the material; and the pattern layer having patterns but no adhesive property. In this construction, an adhesive agent is applied to the pattern layer of the transferring member before a transfer is carried out, or the pattern of the pattern layer may be transferred to the material after an adhesive tape is adhered to the pattern layer. In this case, an adhesive agent having a great adhesive property or a water adhesive agent may be used so that a transfer can be carried out at a low temperature and a thermal deformation of the material can be prevented. When the above adhesive tape is used, a heating operation can be advantageously eliminated in a transfer process.

In addition, the transferring member 3 may consist of the release sheet made of the base film; the release layer which is left on the pattern layer when the release sheet is separated from the material; and the pattern layer having patterns but no adhesive property. In this construction, the pattern of the pattern layer of the transferring member is transferred to the material having an adhesive agent applied thereto or the material having an adhesive tape stuck thereto. In this case, an adhesive agent having a great adhesive property or a water adhesive agent may be used so that a transfer can be carried out at a low temperature and a thermal deformation of the material can be prevented. When the above adhesive tape is used, a heating operation can be eliminated in a transfer process.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A transferring apparatus for transferring a pattern onto an article, comprising:

a base for supporting the article;

a supporting frame having an open end and a closed end, said open end facing said base;

a flexible sheet mounted to said supporting frame to cover said open end thereof and form a substantially enclosed sheet pressurizing chamber between said flexible sheet and said supporting frame;

means for heating said flexible sheet;

a transferring member movably mounted between said base and said flexible sheet, with spacing between said transferring member and each of said flexible sheet and said base, for longitudinal movement relative to each of said flexible sheet and said base;

a driving member for moving one of said supporting frame and said base toward and away from the other of said supporting frame and said base;

a fluid supply member for supplying fluid into said sheet pressurizing chamber to press said flexible sheet toward said base; and wherein said driving member and said fluid supply member together constitute a means for pressing said transferring member against the article supported on said base.

2. A transferring apparatus as recited in claim 1, wherein said base includes a support surface on which the article is supported, and said support surface has suction holes formed therein; and a suction means is provided for sucking gas through said suction holes in a direction away from said transferring member in order to attract said transferring member and cause said transferring member to conform to a shape of the article.

3. A transferring apparatus as recited in claim 2, wherein said driving member comprises a means for causing said supporting frame to seat against said base such that an enclosed evacuation chamber is formed between said transferring member and said support surface of said base.

4. A transferring apparatus as recited in claim 1, wherein an adhesive is formed on one of the article and a side of said transferring member facing the article; and said transferring member comprises a base film, a release layer mounted on a side of said base film facing said base, and a pattern layer mounted on a side of said release layer facing said base;

said pattern layer has the pattern formed thereon which is to be transferred to the article; and said base film comprises a means for releasing said release layer upon being heated such that, when said transferring member is pressed against the article and is heated, both said release layer and said pattern layer are released and adhered onto the article.

5. A transferring apparatus as recited in claim 1, wherein said spacing between said flexible sheet and said transferring member is substantially free of any obstructions to movement of said flexible sheet toward said transferring member, such that said means constituted by said driving member and said fluid supply member is operable to move said flexible sheet into contact with said transferring member in an unimpeded manner.

6. A transferring apparatus as recited in claim 1, wherein said means constituted by said driving member and said fluid supply member is operable to first move said supporting frame toward said base such that said flexible sheet presses said transferring member against the article and to subsequently supply fluid into said sheet pressurizing chamber to cause said flexible sheet to further press said transferring member against the article.

7. A transferring apparatus as recited in claim 1, wherein said means constituted by said driving member and said fluid supply member is operable to first supply fluid into said sheet pressurizing chamber and to subsequently move said supporting frame toward said base such that said flexible sheet presses said transferring member against the article.

8. A transferring apparatus as recited in claim 1, wherein said driving member is connected to said supporting frame and is operable to move said supporting frame toward and away from said base.

9. A transferring apparatus as recited in claim 1, wherein said driving member is connected to said base and is operable to move said base toward and away from said supporting frame.

10. A transferring method for transferring a pattern onto an article, comprising:

placing the article on a support surface of a base;

providing a supporting frame having an open end and a closed end, such that said open end faces said base;

mounting a flexible sheet to said supporting frame to cover said open end thereof and form a substantially enclosed sheet pressurizing chamber between said flexible sheet and said supporting frame;

heating said flexible sheet;

movably mounting a transferring member between said base and said flexible sheet, with spacing between said transferring member and each of said flexible sheet and said base, such that the transferring member can be moved longitudinally relative to each of said flexible sheet and said base;

operating a driving member to move one of said supporting frame and said base toward and away from the other of said supporting frame and said base;

operating a fluid supply member to supply fluid into said sheet pressurizing chamber to press said flexible sheet toward said base; and wherein said step of operating said driving member and said step of operating said fluid supply member together cause said transferring member to be pressed against the article supported on said base.

11. A transferring method as recited in claim 10, further comprising providing suction holes in said support surface of said base; and sucking gas through said suction holes in a direction away from said transferring member in order to attract said transferring member and cause said transferring member to conform to a shape of the article.

12. A transferring method as recited in claim 11, wherein said step of operating said driving member comprises operating said driving member to cause said supporting frame to seat against said base such that an enclosed evacuation chamber is formed between said transferring member and said support surface of said base.

13. A transferring method as recited in claim 10, further comprising forming an adhesive on one of the article and a side of said transferring member facing said article;

wherein said step of providing said transferring member comprises providing a transferring member comprising a base film, a release layer mounted on a side of said base film facing said base, and a pattern layer mounted on a side of said release layer facing said base, said pattern layer having the pattern formed thereon which is to be transferred to the article, and said base film comprising a means for releasing said release layer upon being heated such that, when said transferring member is pressed against the article and is heated, both said release layer and said pattern layer are released and adhered onto the article.

14. A transferring method as recited in claim 10, further comprising maintaining said spacing between said flexible sheet and said transferring member substantially free of any obstructions to movement of said flexible sheet toward said transferring member, such that upon operating said driving member and said fluid supply member said flexible sheet is moved into contact with said transferring member in an unimpeded manner.

15. A transferring method as recited in claim 10, wherein in said steps of operating said driving member and said fluid supply member, said supporting frame is first moved toward said base such that said flexible sheet presses said transferring member against the article and subsequently fluid is supplied into said sheet pressurizing chamber to cause said flexible sheet to further press said transferring member against the article.

16. A transferring method as recited in claim 10, wherein in said steps of operating said driving member and said fluid supply member, fluid is first supplied into said sheet pressurizing chamber and subsequently said supporting frame is moved toward said base such that said flexible sheet presses said transferring member against the article.

17. A transferring method as recited in claim 10, further comprising connecting said driving member to said supporting frame; and wherein in operating said driving member, said supporting frame is moved toward and away from said base.

18. A transferring method as recited in claim 10, further comprising connecting said driving member to said base; and wherein in operating said driving member, said base is moved toward and away from said supporting frame.

* * * * *